(12) United States Patent
Grimault et al.

(10) Patent No.: US 9,602,333 B2
(45) Date of Patent: Mar. 21, 2017

(54) DNS SERVER, GATEWAYS AND METHODS FOR MANAGING AN IDENTIFIER OF A PORT RANGE IN THE TRANSMISSION OF DATA

(75) Inventors: Jean-Luc Grimault, Mondeville (FR); Mohammed Kassi Lahlou, Fontaine Etoupefour (FR)

(73) Assignee: France Telecom, Paris (FR)

( * ) Notice: Subject to any disclaimer, the term of this patent is extended or adjusted under 35 U.S.C. 154(b) by 329 days.

(21) Appl. No.: 13/637,341

(22) PCT Filed: Mar. 22, 2011

(86) PCT No.: PCT/FR2011/050606
§ 371 (c)(1),
(2), (4) Date: Sep. 25, 2012

(87) PCT Pub. No.: WO2011/117534
PCT Pub. Date: Sep. 29, 2011

(65) Prior Publication Data
US 2013/0013739 A1 Jan. 10, 2013

(30) Foreign Application Priority Data
Mar. 26, 2010 (FR) ..................................... 10 52209

(51) Int. Cl.
*G06F 15/16* (2006.01)
*H04L 29/12* (2006.01)
(52) U.S. Cl.
CPC .. *H04L 29/12066* (2013.01); *H04L 29/12377* (2013.01); *H04L 29/12462* (2013.01);
(Continued)

(58) Field of Classification Search
CPC ......... H04L 29/12367; H04L 29/12377; H04L 61/2514; H04L 61/2517
(Continued)

(56) References Cited

U.S. PATENT DOCUMENTS 6,016,512 A * 1/2000 Huitema ........................ 709/245
6,822,955 B1 * 11/2004 Brothers et al. ............... 370/389
(Continued)

OTHER PUBLICATIONS

M. Boucadair et al., "Anticipate IPv4 Address Exhaustion: A Critical Challenge for Internet Survival", Evolving Internet, 2009, Internet '09, First International Conference on, IEEE Piscataway, NJ, pp. 27-32, XP031540612.
(Continued)

*Primary Examiner* — Hua Fan
(74) *Attorney, Agent, or Firm* — Cozen O'Connor

(57) ABSTRACT

A DNS server (110) and to a method of managing a DNS request, the method comprising receiving (E2) a DNS request for accessing a remote application (104B) accessible via a gateway (106B) and sending (E3) a DNS response including the IP address of the gateway (106B), the method further comprising a verification for determining whether a port range identifier is stored in the DNS server (110) in association with the IP address of the gateway (106B), and if so, the identifier is inserted in the DNS response before sending the DNS response. The invention also provides a method of transmitting data from a first gateway (106A) to a second gateway (106B), a method of transmitting data from a gateway (106B) to a server (102B) of a local network (LAN_B), and the gateways (106A, 106B) for performing such methods.

15 Claims, 4 Drawing Sheets

(52) U.S. Cl.
CPC .... *H04L 29/12924* (2013.01); *H04L 61/1511* (2013.01); *H04L 61/255* (2013.01); *H04L 61/2517* (2013.01); *H04L 61/6063* (2013.01); *H04L 61/6095* (2013.01)

(58) Field of Classification Search
USPC .................................................. 709/217, 245
See application file for complete search history.

(56) References Cited

U.S. PATENT DOCUMENTS

| | | | |
|---|---|---|---|
| 7,099,957 B2 * | 8/2006 | Cheline et al. | 709/245 |
| 7,197,550 B2 * | 3/2007 | Cheline et al. | 709/223 |
| 7,280,999 B2 * | 10/2007 | Chung et al. | |
| 7,349,967 B2 * | 3/2008 | Wang | 709/227 |
| 7,391,768 B1 * | 6/2008 | Samprathi et al. | 370/389 |
| 7,443,880 B2 * | 10/2008 | Wetterwald et al. | 370/466 |
| 7,457,279 B1 * | 11/2008 | Scott et al. | 370/352 |
| 7,496,652 B2 * | 2/2009 | Pezzutti | 709/223 |
| 7,496,950 B2 * | 2/2009 | Carley | 726/3 |
| 7,533,164 B2 * | 5/2009 | Volz et al. | 709/223 |
| 7,583,668 B1 * | 9/2009 | Mayes et al. | 370/389 |
| 7,636,790 B1 * | 12/2009 | Parker et al. | 709/245 |
| 7,643,472 B2 * | 1/2010 | Schneider et al. | 370/352 |
| 2003/0065818 A1 * | 4/2003 | Anderson et al. | 709/245 |
| 2003/0149740 A1 * | 8/2003 | Wookey et al. | 709/217 |
| 2003/0163544 A1 * | 8/2003 | Wookey et al. | 709/217 |
| 2004/0073707 A1 * | 4/2004 | Dillon | 709/245 |
| 2006/0271707 A1 * | 11/2006 | Cheline et al. | 709/245 |
| 2007/0094411 A1 * | 4/2007 | Mullane et al. | 709/245 |
| 2007/0168458 A1 * | 7/2007 | Costa-Requena et al. | 709/217 |
| 2007/0291727 A1 * | 12/2007 | Hellum et al. | 370/345 |
| 2008/0043975 A1 * | 2/2008 | Miloslavsky et al. | 379/219 |

OTHER PUBLICATIONS

Gulbrandsen Troll Technologies P Vixie Internet Software Consortium L Esibov Microsoft Corp A: "A DNS RR for specifying the location of services (DNS SRV); rfc2782.txt", IETF Standard, Internet Engineering Task Force, IETF, XP015008565, Feb. 1, 2000.

Jim Rees, "PE-ARP: Port Enhanced ARP for IPv4 Address Sharing", Sep. 30, 2009, XP002616240, p. 14 http://www.merit.edu/networkresearch/papers/pdf/2009-01.pdf.

* cited by examiner

DNS SERVER, GATEWAYS AND METHODS FOR MANAGING AN IDENTIFIER OF A PORT RANGE IN THE TRANSMISSION OF DATA

RELATED APPLICATIONS

This is a U.S. National Phase Application under 35 USC 371 of International Application PCT/FR2011/050606 filed on Mar. 22, 2011.

This application claims the priority of French Application No. 10/52209 filed Mar. 26, 2010, the entire content of which is hereby incorporated by reference.

BACKGROUND OF THE INVENTION

The invention relates to the general field of exchanging data via the Internet, and it relates more particularly to communications between remote applications via access gateways.

In known manner, an access gateway enables a plurality of terminals in a given local network to communicate with remote networks, and to do so via the Internet, for example.

FIG. 1 shows an example in which a first terminal 2A included in a local network LAN_A can communicate with a remote server 2B situated in a remote local network LAN_B. To do this, a first gateway 6A is placed in series between the terminal 2A and the Internet, and the second gateway 6B is placed in series between the server 2B and the Internet. In this way, an application client 4A implemented in the terminal 2A can communicate with a remote application 4B situated in the server 2B. In this example, consideration is given to a web browser implemented in the terminal 2A and seeking to communicate with a web server implemented in the server 2B.

In general, each piece of equipment connected directly to the Internet (such as the gateways 6A and 6B, for example) must be identified by an IP address referred to as a "public address" in order to be able to communicate with other pieces of equipment on the Internet. By way of example, such an address is allocated on registering with a DHCP server (i.e. a server that allocates IP addresses using the dynamic host configuration protocol). A public IP address is said to be "routable" over the Internet, i.e. that it can be used to identify the source or the destination of a data packet transferred via the Internet.

Furthermore, each piece of host equipment in a local network (such as the terminal 2A or the server 2B) must be identified by means of an IP address known as a "private address" or a "local address", with this address being specific to the local network in question. A local IP address may be allocated to only one piece of equipment within a given local network, thereby enabling a gateway to identify the pieces of equipment with which it communicates in its local network. A local address is not routable over the Internet, which means that it cannot be used outside the local network under consideration.

At present, the number of public IP addresses allocated to a given gateway is frequently less than the number of pieces of equipment (terminals, servers, . . . ) present in the local network of the gateway. The gateway then implements a network address translation (NAT) function that consists in storing correspondences between local IP addresses and public IP addresses in pairs in a table in the form (local address, public address). The gateway is thus capable of dynamically assigning the public addresses it has available to the pieces of equipment in its own local network seeking to communicate at any given instant outside the local network.

In addition, the NAT function frequently updates the user datagram protocol (UDP) or transmission control protocol (TCP) ports of the communications sessions of pieces of equipment in order to be parsimonious in the use of the public address (or addresses) allocated to the gateway. The NAT function is then a so-called network address port translation (NAPT) function that consists in storing the correspondences between local and public IP addresses, and also the corresponding public and private ports. Each correspondence is then stored in a table as an entry having the form (local address, local port, public address, public port). In the present document, the term "NAPT" is referred to more simply by using the term "NAT".

Thus, the gateways 6A and 6B update their respective NAT tables 8A and 8B as soon as they obtain new assignments of public addresses and associated ports.

Furthermore, at present, the Internet protocol that is in the most widespread use for implementing IP addresses is known by the acronym IPv4 (for Internet protocol version 4). This IP protocol version serves to allocate so-called "IPv4" IP addresses that are encoded on four 8-bit bytes, which corresponds to 32-bit coding. In general, an IPv4 address is written in the form of four decimal numbers separated by dots, e.g. such as 193.43.55.67.

Unfortunately, it is generally accepted by the community of IP connectivity service providers that it is inevitable that available public IPv4 addresses will become exhausted. Encoding IPv4 addresses on 32 bits limits the number of potential IPv4 addresses to $2^{32}$ (i.e. 4,294,967,296), and thus limits the subset of distinct public addresses that can be allocated within the Internet by the appropriate authorities (e.g. the Internet assigned numbers Authority (IANA)). Initial shortages of public IPv4 addresses are predicted for early 2011.

This outlook has led operators to plan solutions for mitigating this shortage. Thus, in order to overcome the limitation associated with 32-bit coding of IPv4 addresses in the long run, operators are progressively putting into place a new IP protocol version known by the acronym IPv6 (Internet protocol version 6). This new protocol enables IP addresses to be encoded on 128 bits (giving $2^{128}$ potential distinct IP addresses), thereby providing an address space that is much larger. Nevertheless, a certain amount of time is going to be necessary to enable the new protocol to be implemented and harmonized throughout the Internet.

In parallel with IPv6 deployments, one of the transitional solutions consists in enabling public IPv4 addresses to be shared between a plurality of Internet clients. In this way, a plurality of clients (gateways, etc.) may be connected to the Internet while using a single public IPv4 address in common, referred to as a "shared" address.

Below in this document, the term "address" or "IP address" is used to refer to an IPv4 address.

At present, certain systems already enable shared IPv4 addresses to be managed on the Internet. One solution commonly known as a "port range" has been developed in particular to deal with the shortage of IPv4 addresses. That solution consists in allocating to an Internet access gateway:
  a shared public IPv4 address; and
  a fixed range of authorized source ports.

The operating principle of the port range method is described below with reference of the access gateway 6A shown in FIG. 1.

In the port range method, the gateway 6A has allocated thereto a public IPv4 address that is written AdresPub, together with an authorized port range PortRange_A, e.g. arranged going from port 1024 to port 2047. The public address AdresPub is a shared address that can be assigned to other gateways, such as the gateway 6B, for example, providing the associated port range PortRange_B is completely disjoint from the range PortRange_A.

Furthermore, the gateway 6A implements a NAT function: on receiving an IP data packet from the terminal 2A destined for the terminal 2B and specifying as its source the private address of the terminal 2A and the source port associated with the application 4A, the gateway 6A replaces the source address of the packet by the public address AdresPub and, if necessary, it modifies the source port so as to make it lie in the range PortRange_A.

Furthermore, when a data packet is sent from the Internet to the gateway 6A, a specific piece of Internet equipment known as a port range router (PRR) (not shown in FIG. 1) is capable of determining the gateway to which the packet is to be sent, with this being based on the destination IPv4 address and on the destination port included in the packet in question. The PPR then steers the packet in transit towards the appropriate destination gateway and it does so without modifying the packet in question. For example, if the PRR determines that the destination address of the packet is AdresPub and that the destination port of the same packet lies in the range PortRange_A, it directs the packet towards the gateway 6A.

It should be observed that the application field of the port range method is not limited to Internet access gateways, but may be applied to other pieces of equipment, such as mobile terminals, for example.

The port range method is described in particular in the following documents: WO 2009/125158A2, WO 2010/004156A1, and WO 2010/004180A1.

Nevertheless, the port range method presents drawbacks for certain uses.

For example, if the gateway 6B implements the port range method, then the web browser 4A on the terminal 2A will in general be unable to access the web server 4B hosted in the server 2B. In order to access the web server, the web browser must send IP data packets to the gateway 6B that include the destination public address and the destination public port that are associated with the web server 4B in the NAT entries 8B. A web server is so called "well-known" application that is accessible by default on private port 80 (hypertext transfer protocol (HTTP)). Unfortunately, since the gateway 6B is implementing the port range function, in its NAT table 8B it has an entry that associates the private port 80 with a given public port PubPort_Server that lies in the range PortRange_B. In general, the web browser 4A has no knowledge of the public port PubPort_Server assigned by the gateway 6B to the web server 4B, and it therefore has no access thereto.

It is therefore necessary for the web server 4B to communicate its public port PubPort_Server to all of its potential application clients, and in particular to the web browser 4A. Various techniques enable an application client such as the web browser 4A to determine PubPort_Server. By way of example, the web browser 4B may install an HTTP tag containing the value of PubPort_Server in a web page of another server on the Internet. However that practice is constraining and not very common. Furthermore, for applications other than a web server, it is not possible to envisage using the HTTP tag technique. Another technique consists in previously informing the domain name servers (DNSs) 10 of the value of PubPort_Server assigned by the gateway 6B to the web server 4B. This function known under the acronym SRV (for service record) is a DNS option that makes it possible in a DNS server to store a port corresponding to a service in association with an IP address. It is thus possible in the DNS server 10 to store the public port number to be used for accessing a remote application in association with the public IP address of the corresponding gateway. By way of example, this information may be stored in a table 12 included in the DNS server 10. By way of example, the web browser 4A may send a request via its gateway 6A to the DNS server 10 and in response it may receive the destination IP address of the web server 4B together with the associated public port PubPort_Server.

Nevertheless, the use of the SRV method in the context of the port range solution is unsatisfactory since numerous application clients (such as most web browsers), are, at present, incapable of making use of the SRV function.

There therefore exists at present a need for a solution that makes it possible to use a public address that is shared among a plurality of port ranges, and for this to be possible without the limitations and drawbacks that are inherent to the conventional port range solution. More precisely, there exists a need for a version of the port range solution that is improved in such a manner that remote applications can communicate with one another via the Internet even though they do not know the public ports of the other parties.

OBJECT AND SUMMARY OF THE INVENTION

To this end, one aspect of the invention provides a method of managing a DNS request, which method is performed by a DNS server and comprises:

a step of receiving a DNS request in order to access a remote application accessible via a gateway; and a step of sending a DNS response including the IP address of said gateway;

the method being characterized in that it further comprises:

a verification step for determining whether a port range identifier is stored in the DNS server in association with the IP address of the gateway; and if so, a step of inserting the identifier in the DNS response before sending the DNS response.

The invention thus makes it possible to store in a DNS server the port range identifier allotted to a gateway in association with the IP address of the gateway. When a DNS server of the invention receives a DNS request in order to accept a remote application that is accessible via a remote gateway, the DNS server sends in return a DNS response including the IP address of the remote gateway. Furthermore, if the DNS server determines that a port range identifier is stored in association with the IP address of the remote gateway, then the DNS server inserts the identifier in the DNS response. By way of example, such insertion can be made possible by using the above-described SRV function.

By way of example, the DNS response is sent to the requesting gateway that sent the DNS request to the DNS server. The presence of the port range identifier in the DNS response then enables the requesting gateway to identify a port range allotted to the remote gateway. The presence of such an identifier in the DNS response means that the remote gateway is using a shared IP address.

Furthermore, the port range identifier may for example correspond to a positive integer identifying a port range allocated to the gateway.

In a particular implementation, the various steps of the managing a DNS request are determined by computer program instructions.

Consequently, another aspect of the invention provides a computer program on a data medium, the program being suitable for being implemented in a DNS server or more generally in a computer, the program including instructions adapted to implementing steps of a method of managing a DNS request as described above.

The program may use any programming language and be in the form of source code, object code, or code intermediate between source code and object code, such as in a partially compiled form or in any other desirable form.

Another aspect of the invention provides a computer-readable data medium or recording medium including instructions of a computer program as mentioned above.

Another aspect of the invention provides a method of transmitting data in a first gateway to a second gateway, the method comprising:
- a preliminary step of storing in the first gateway a port range identifier and the IP address associated with the second gateway to which the data is to be transmitted, the identifier being obtained from a DNS server in response to a DNS request in accordance with the above-described method of managing a DNS request;
- a determination step of using the identifier to determine the destination port number to which the data is to be transmitted; and
- a step of sending the data to the destination port number of the second gateway.

The above-mentioned data transmission method is performed in a first gateway. The first gateway is thus capable, on the basis of said identifier, of determining a destination port number to which the data is to be transmitted, the destination port number lying in a port range allotted to the second gateway. In this way, the first gateway can transmit data to a second gateway that is using a shared IP address.

Furthermore, the determination step may further comprise:
- when a destination port number is initially included in the data, acting during the determination step to determine the destination port number to which the data is to be transmitted from the identifier and from the initial destination port number, and replacing the initial destination port number with the new destination port number as determined in this way; or
- when no destination port number is initially included in said data, encapsulating the data in a data packet (typically an IP/UDP packet) including the destination port as determined during the determination step.

The invention thus enables a gateway to transmit data packets that do not have a destination port to a gateway that is using a shared IP address. By way of example, this may apply to packets of the internet control message protocol (ICMP)/ping type sent by an application client to an application service.

In a particular implementation, the identifier is a positive integer I and the destination port number determined by the first gateway is equal to the initial destination port number incremented by (I·N) ports, where N is a predetermined positive integer.

In a particular implementation, the data transmission method also includes transmitting together with the data a source port number that is determined from a port range identifier associated with the first gateway, the identifier being stored in the first gateway.

The invention thus enables a first gateway using a shared IP address to transmit data to a second gateway, the source port used in the transmitted data packet lying in a port range allotted to said first gateway.

The identifier of a port range associated with the first gateway may for example correspond to a positive integer identifying a port range allotted to the first gateway.

Furthermore, in a particular implementation, the data transmission method further comprises:
- a step of the first gateway receiving a second data packet from said remote application;
- a second determination step performed by the first gateway to use both the identifier associated with the second gateway and a source port number initially included in the second received data packet to determine a source port number for use when transmitting the second packet to a determined application of a local network accessible via the first gateway; and
- a step of the first gateway replacing a source port number initially included in said second data packet with the source port number as determined during the second determination step.

The invention thus advantageously enables the first gateway to transmit a second data packet from the second gateway to the target application using as its source port number the default port of the service accessed by said application.

In a particular implementation, the data is determined by computer program instructions.

Consequently, the invention also provides a computer program on a data medium, the program being suitable for being implemented in a gateway, the program including instructions adapted to implement steps of a data transmission method of one of the implementations described above.

The program may use any programming language and be in the form of source code, object code, or code intermediate between source code and object code, such as in a partially compiled form or in any other desirable form.

The invention also provides a computer-readable data medium or recording medium including instructions of a computer program as mentioned above.

Another aspect of the invention provides a method of transmitting a first data packet from a gateway to a server of a local network accessible via the gateway, the method comprising:
- a preliminary step of storing a port range identifier associated with the gateway;
- a determination step of using the identifier and a destination port number initially included in the first data packet to determine the destination port number of the server to which the first data packet is to be transmitted; and
- a step of sending said first data packet to said destination port number of the server.

By way of example, the identifier may correspond to a positive integer identifying a port range allotted to the gateway.

In a particular implementation, the identifier is a positive integer I and the destination port number determined by the gateway is equal to a destination port number initially included in the first data packet, which initial number is decremented by (I·N) ports, where N is a predetermined integer.

In a particular implementation, the transmission method further comprises:

a step of the gateway receiving a second data packet sent by the server in response to the first data packet received by the server;

a determination step of using the identifier to determine a source port number for transmitting with the second data packet; and a step of sending the second data packet on the basis of the source port number as determined in this way.

The second gateway is thus capable of sending a second data packet to the first gateway by using a source port number lying in a range of ports that is allotted thereto.

In a particular implementation, the various steps of the data transmission method as described above are determined by computer program instructions.

Consequently, the invention also provides a computer program on a data medium, the program being suitable for being implemented in a gateway, the program including instructions adapted to implement steps of the data transmission method according to any of the above-described implementations.

The program may use any programming language and be in the form of source code, object code, or code intermediate between source code and object code, such as in a partially compiled form or in any other desirable form.

The invention also provides a computer-readable data medium or recording medium including instructions of a computer program as mentioned above.

The above-mentioned recording media may be any kind of entity or device capable of storing the program. For example, the medium may comprises storage means such as a read only memory (ROM), for example a compact disk (CD) ROM or a microelectronic circuit ROM, or indeed magnetic recording means, e.g. a floppy disk or a hard disk.

Furthermore, the recording media may correspond to a transmission medium such as an electrical or optical signal suitable for being conveyed by an electrical or optical cable, by radio, or by other means. The program of the invention may in particular be downloaded from an Internet type network.

Alternatively, the recording media may correspond to an integrated circuit in which the program is incorporated, the circuit being adapted to execute or to be used in the execution of the method in question.

It should be observed that the advantages and comments mentioned with reference to the various implementations of the method of managing a DNS request and of the data transmission methods apply in analogous manner to the various embodiments of the invention providing a DNS server or gateway.

Another aspect of the invention provides DNS server configured to process a DNS request, the server comprising:

means for receiving a DNS request to access a remote application accessible via a gateway; and means for sending a DNS response including the IP address of the gateway;

the DNS server being characterized in that it further comprises:

verification means for determining whether a port range identifier is stored in the DNS server in association with the IP address of the gateway; and insertion means configured to act when the result of the verification is positive to insert the identifier into the DNS response before sending the DNS response.

The invention also provides a gateway configured for transmitting data to a second gateway, the gateway comprising:

determination means for using a port range identifier associated with the IP address of the second gateway to determine a destination port number to which the data is to be transmitted; and means for sending the data to the destination port number.

In addition, the invention also provides a gateway configured to transmit data to a server of a local network accessible via the gateway, the gateway comprising:

storage means for storing a port range identifier associated with the gateway;

determination means for using the identifier to determine the destination port number of the server to which the data is to be transmitted; and means for sending the data to the destination port number.

BRIEF DESCRIPTION OF THE DRAWINGS

Other characteristics and advantages of the present invention appear from the following description made with reference to the accompanying drawings that show an implementation having no limiting character. In the figures.

DETAILED DESCRIPTION OF AN IMPLEMENTATION

The invention relates to exchanging data between remote applications via a communications network such as the Internet. Nevertheless, it should be observed that the invention may be applied to other types of communications networks, e.g. such as mobile networks of the universal mobile telecommunication system (UMTS) type.

Figure 1:
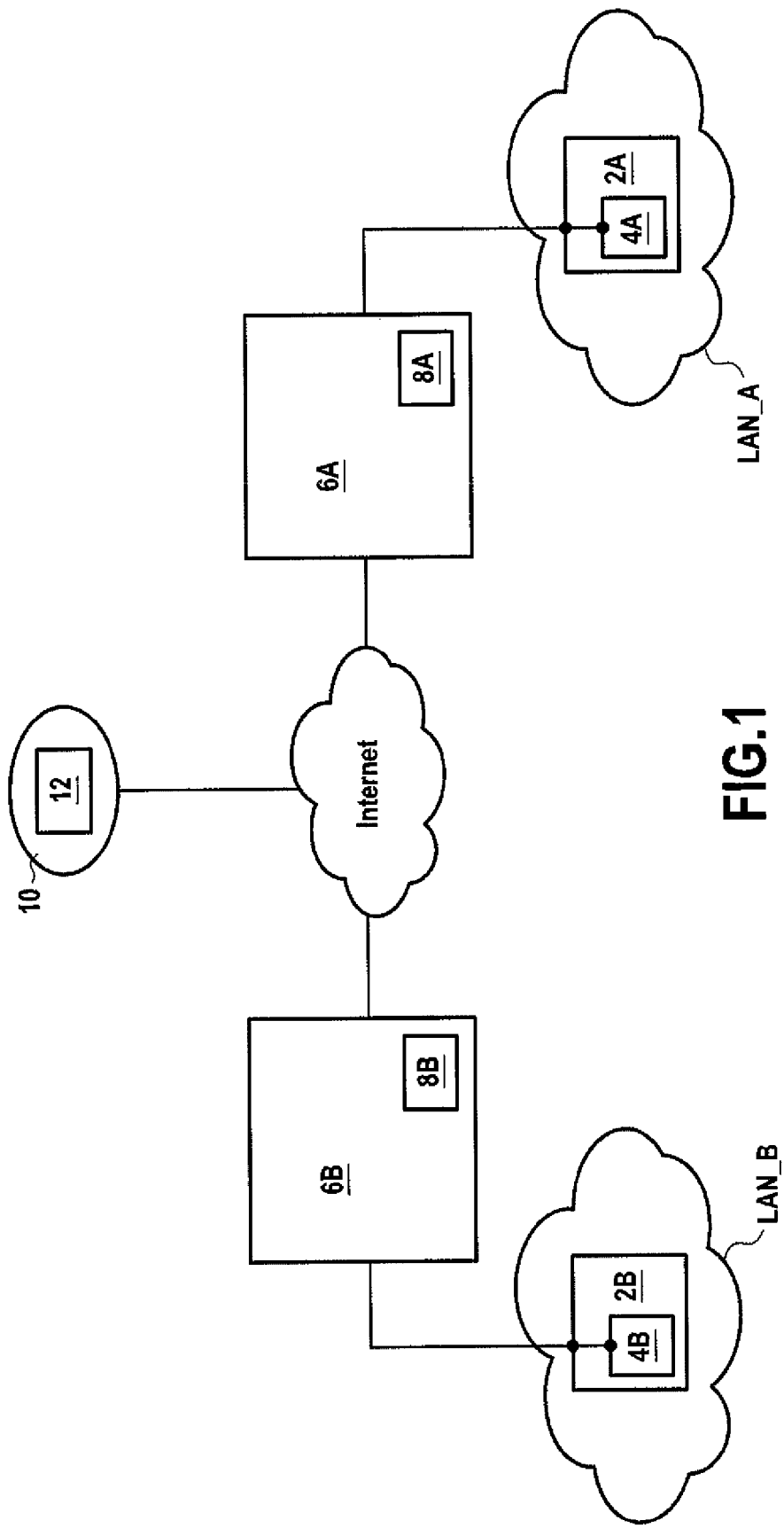
FIG. 1 is a diagram showing an environment implementing a DNS server and gateways in conventional manner.
Figure 2:
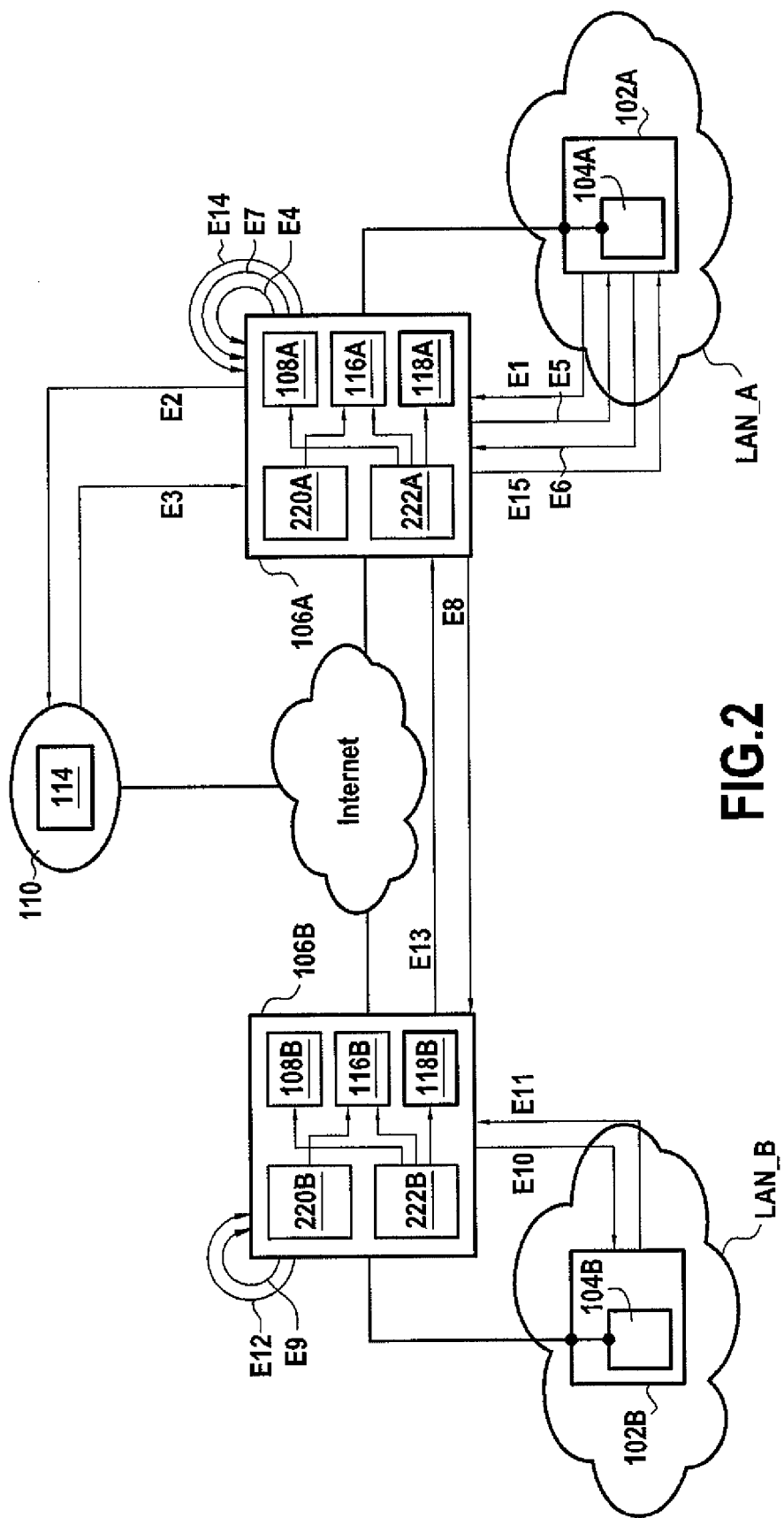
FIG. 2 is a diagram showing an environment similar to that shown in FIG. 1 in which there can be seen a DNS server and gateways in accordance with the invention, together with the steps of the method of the invention for managing a DNS request and the steps of the transmission methods of the invention.

FIG. 2 shows an environment similar to that shown in FIG. 1. More precisely, an access gateway 106A is placed in series between a local network LAN_A and the Internet, with the local network LAN_A including a terminal 102A in which an application client 104A is implemented. Similarly, an access gateway 106B is placed in series between a local network LAN_B and the Internet, with the local network LAN_B including a server 102B that implements an application service 104B. In the example described herein, the applications 104A and 104B are respectively a web browser and a web server.

In the example described herein, the gateways 106A and 106B have the hardware architecture of conventional gateways. In particular, each of them comprises a processor, random access memory (RAM), ROM, and non-volatile memory.

The ROM constitutes a recording medium in accordance with the invention in which it is possible to record a computer program in accordance with the invention that includes instructions for executing steps of one of the transmission methods of the invention (with these methods being described in greater detail below).

The gateways 106A and 106B also include means for communicating with the terminals or servers of their respective local networks, and also with the Internet.

A local address AdresPriv_TA that is unique within the local network LAN_A is allocated by the gateway 106A to the terminal 102A. Similarly, a local address AdresPriv_SB that is unique within the local network LAN_B is allocated by the gateway 106B to the server 102B.

Furthermore, each of the gateways 106A and 106B possesses a respective public IP address written AdresPub_A and AdresPub_B, enabling them to transmit data coming from their respective local networks to the terminal, and vice versa. The public addresses AdresPub_A and AdresPub_B are shared addresses, which means that other gateways (or other types of equipment connected to the Internet) might be using the same public addresses for communicating via the Internet. Under most circumstances, the addresses Adres-Pub_A and AdresPub_B are different, however it is possible to envisage circumstances in which these two addresses are identical.

Consideration is given herein to the example in which 65536 distinct ports can be used for a single public IP address. These ports are allotted in the form of port ranges to different clients (gateways, etc.) identified using the same public IP address.

Traditionally, the port numbers 0 to 1023 are considered by the IANA as being "well-known ports". A port is said to be well known when it is assigned by default to a known application, i.e. an application that is recognized and standardized by the IANA. For example, port 80 is the port number dedicated to the HTTP protocol and the port 21 is the port used for the file transfer protocol (FTP).

In this example, it is considered that all of the pieces of equipment using the shared public IF addresses AdresPub_A and AdresPub_B have respective port ranges of the same size, i.e. a range having N distinct ports (where N is a positive integer). Nevertheless, it is possible to envisage circumstances in which the various port ranges of a single shared IP address present sizes that are different.

N is thus selected in such a manner that the total number of different ports (i.e. 65536 in the present example) is divisible by N. In this example, there therefore exist 65536/N different port ranges that can be allocated for a given shared public address.

Figure 3:
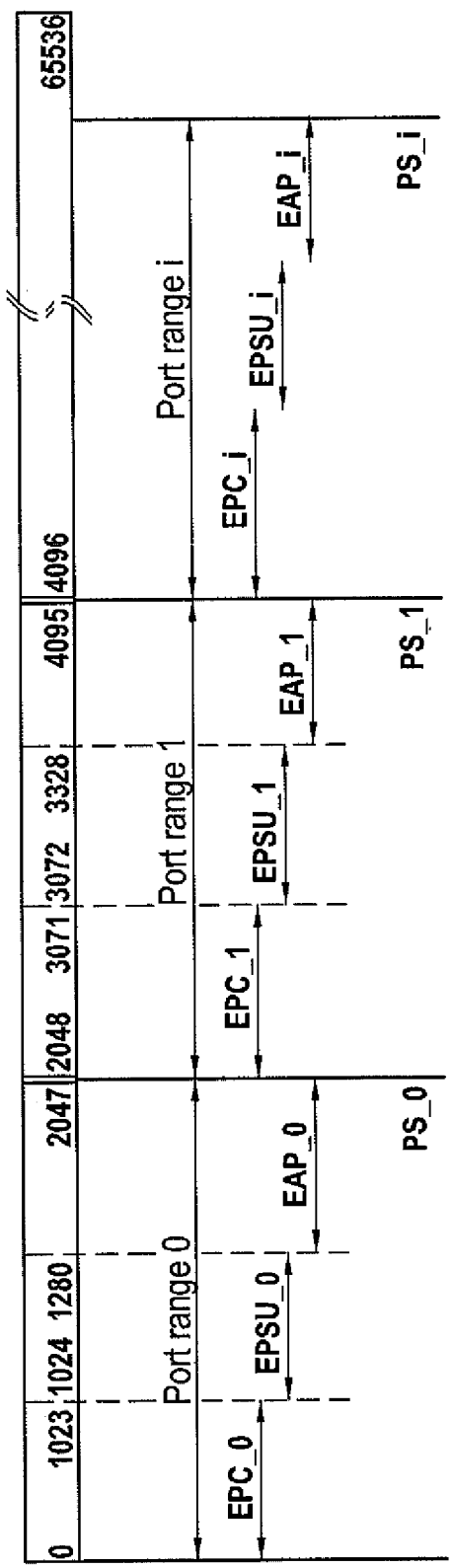
FIG. 3 shows an example of how the port space associated with a shared IP address can be segmented into a plurality of port ranges and port range subsets, with this being done in accordance with a particular implementation of the invention.

FIG. 3 shows how the 65536 ports that are available for the addresses AdresPub_A and AdresPub_B are segmented in the example under consideration into port ranges and port range subsets.

Consideration is given initially to the integer $i$ representing a port range number allotted to a gateway. The number $i$ is such that:

$$0 \leq i < i_{max} = 65536/N$$

Furthermore, if consideration is given to the integer $m$ representing a port number in a given port range $i$, then $m$ satisfies the following condition:

$$i \cdot N \leq m < i \cdot (N+1)$$

In the example of FIG. 3, consideration is given to the situation in which the ports are shared among 32 disjoint ranges each having 2048 ports (N=2048 and $i_{max}$=31).

Firstly, the term EPC_i is used to designate the subset of ports in the range $i$ such that, regardless of the port number $m$ in this subset, $m$ satisfies the following condition:

$$(i \cdot N) \leq m < 1024 + (i \cdot N)$$

As shown in FIG. 3, EPC_i corresponds to the set of ports [0 to 1023] (i.e. EPC_0) shifted by a number of ports that is equal to (i·N). There is therefore no shift for EPC_0 (i=0).

The subset EPC_i corresponds to the well-known ports used in the context of applications that are considered by the IANA as being well known, with a shift of (i·N).

The term EPSU_i is also used to designate a subset of ports in the range $i$ that are referred to as "specific" ports, this subset satisfying the following condition:

$$1024 + (i \cdot N) \leq m < 1024 + EPSUL + (i \cdot N)$$

where EPSUL is the number of ports contained in this subset of specific ports.

The subset EPSUL_i corresponds to the set of ports [1024, 1023+EPSUL] (i.e. EPSUL_0) shifted by a number of ports equal to (i·N). There is therefore no shift for the subset EPSU_0 (i=0).

The specific ports are used in association with specific applications that are specific to the environment under consideration.

In the example of FIG. 3, EPSUL is selected to be equal to 256 ports. Nevertheless, it will be understood that other values may be allocated to EPSUL.

Furthermore, the term PS_i is used to designate the port number corresponding to the last port of the range $i$, i.e. the port number:

$$m = (i \cdot (N+1)) - 1$$

In particular, for PS_0, there is no shift (i=0).

Finally, the term EAP_i is used to designate the subset of the range $i$ that has all of the ports situated outside the subset EPC_i, EPSU_i, and PS_i. In other words, EAP_i corresponds to a subset of ports satisfying the following condition:

$$1024 + EPSUL + (i \cdot N) \leq m < (i \cdot (N+1)) - 1$$

The order in which the subsets EPC_i, EPSU_i, EAP_i, and PS_i are shown distributed in FIG. 3 is merely one particular implementation of the invention. It is possible to envisage arranging these port subsets in some other order. For example, the subsets may be arranged successively in the following order: EPC_i, PS_i, EPSU_i, EAP_i.

Nevertheless, it should be observed that it is preferable for the subset EPC_i to be placed at the beginning of the range $i$ so as to make the invention easier to implement.

Furthermore, in the example described herein, the DNS server 110 has the hardware architecture of a computer. In particular it comprises a processor, RAM, ROM, and a non-volatile memory.

The ROM constitutes a recording medium in accordance with the invention that is readable by the DNS server 110 and on which there is recorded a computer program in accordance with the invention, including instructions for executing steps of a method of managing a DNS request in accordance with the invention. The main steps of the method are described in greater detail below.

The DNS server 110 also includes means for communicating with the Internet.

Figure 4:
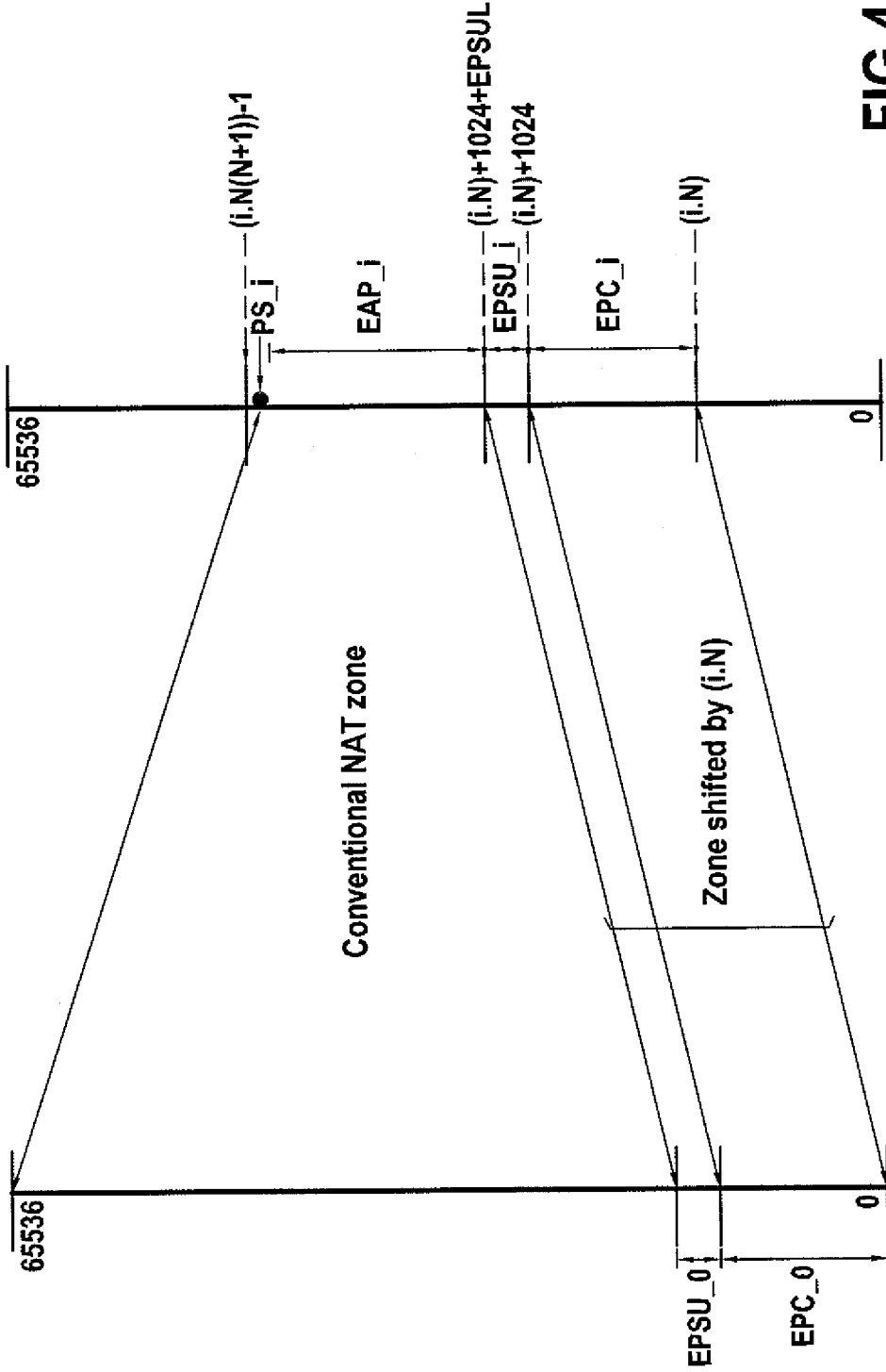
FIG. 4 is a diagram showing an example of port number conversion in accordance with the invention.

A particular implementation of the invention is described below with reference to FIGS. 2, 3, and 4. Consideration is given more particularly to the environment of FIG. 2 in which the shared public addresses AdresPub_A and Adres-Pub_B are segmented into port ranges and subsets in accordance with the example shown in FIG. 3, with N=2048, EPSUL=256, and 0≤i≤31.

Furthermore, in the example described herein, the gateways 106A and 106B have the following two items of information available:

the shared public address allocated thereto, i.e. Adres-Pub_A or AdresPub_B, as the case may be; and the identifier of a port range allocated thereto, i.e. respectively i_A and i_B.

In this implementation, the above two items of information are recorded in the form of an entry (AdresPub, i) in a table RangeAdresTable contained in each of the gateways. More particularly, the RangeAdresTable table contained in the gateway 106A is referenced 116A, this table including in particular the entry (AdresPub_A, i_A). Likewise, the RangeAdresTable table 116B contained in the gateway 106B includes the entry (AdresPub_B, i_B).

In contrast, in the context of the invention, the terminal 102A and the server 102B have no need to know the address ranges allocated to their respective gateways. The terminal 102A and the server 102B take no account of the port range numbers allocated to their respective gateways.

The gateway 106A also includes a table referenced 118A for storing the local port that is used by the application 104A in association with the local address AdresPriv_TA of the terminal 102A. In analogous manner, the gateway 106B includes a table 118B serving to store the local port used for the application service 104B in association with the local address Adres_SB of the server 102B.

The other elements making up the gateways 106A and 106B are described in greater detail below.

Consideration is given at this point to the application client 104A attempting to communicate with the application service 104B. In this example, the operation of the invention is identical regardless of whether the service 104B is a "well-known" application or a "specific" application.

When the web browser of the terminal 102A seeks to access the remote web server 104B, it begins by sending a DNS request to the DNS server 110 (step E1). This DNS request includes a fully qualified domain name that is associated with the web server 104B) (e.g. sending the universal resource locator (URL) www.abcdef.ghi).

The gateway 106A in series between the terminal 102A and the terminal then receives the DNS request and transmits it to the DNS server 110 (step E2).

Once the DNS request has been received, the DNS server 110 consults an internal table 114 in order to determine the public IP address AdresPub_B of the gateway associated with the application 104B.

Once the address AdresPub_B has been determined, the DNS server 110 constructs a DNS response for the gateway 106A, which response includes said public address.

In addition, before sending the DNS response, the DNS server 110 also verifies whether a port range number i_B linked with the gateway 106B is stored in association with the public IP address of the gateway 106B. If so, the DNS server inserts the port range number i_B in the DNS response for sending to the gateway 106A. By way of example, this insertion may be performed by making use of the above-described SRV function.

Consideration is given below to the situation in which the results of the verification is positive and the DNS server 110 sends a DNS response including AdresPub_B and i_B to the gateway 106A (step E3).

Once this DNS response has been received, the gateway 106A verifies whether a port range number i_B is included in the response (step E4). If so, the gateway 106A stores the entry (AdresPub_B, i_B) in its RangeAdresTable table 116A. In addition, the gateway 106A transmits a message to the terminal 102A, which message contains the public IP address AdresPub_B supplied by the DNS server (step E5). In contrast, this message does not contain the port range number i_B supplied by the DNS server 110. The advantages that result from the number i_B being absent from this message are described in detail below.

In this example, the DNS request processing and the DNS responses is performed by a DNS processor module 220A, which module makes reference to the RangeAdresTable table 116A.

Once the public IP address AdresPub_B of the gateway 106B has been received, the application client 104A can communicate with the application service 104B. To do this, the terminal 102A sends a first data packet to the server 102B (step E6). This data packet includes:

a source address corresponding to the local address AdresPriv_TA of the terminal 102A;

a source port corresponding to the source port Port_TA used by the application 104A;

a destination address corresponding to the public IP address AdresPub_B of the gateway 102B; and a destination port corresponding to the port DefDest_PortTA associated with the application 104B.

When the application to be reached is considered to be well known, i.e. an application for which the associated port lies in the range 0 to 1023 (subset EPC_0), the port DefDest_PortTA that is used by the application 104B corresponds to the default port associated with that application. For example, when the applications 104A and 104B are respectively a web browser and a web server, the web browser selects the default HTTP destination port, i.e. the port 80.

In analogous manner, when the application to be reached is a so-called "specific" application, the application 104A selects a default destination port DefDest_PortTA associated with this application. This port thus lies in the subset EPSU_0, i.e. in the range [1024, 1023+EPSUL].

It should be observed that under certain circumstances, the first data packet does not contain a destination port to which the packet is to be sent. By way of example, this may happen when the terminal 102A sends an ICMP/ping packet to the server 102B.

When the gateway 106A receives the first data packet, it verifies in its internal RangeAdresTable table 116A whether there exists an (AdresPub_B, i_B) entry (step E7). If no entry of this type exists, then the gateway 106A considers that the gateway 106B does not possess a share public IP address. Consequently, the gateway 106A does not modify the destination port DefDest_PortTA included in the first data packet.

In contrast, if such an entry is present in the RangeAdresTable table 116A, then the gateway 106A determines a new destination port PortPub_B to which the first data packet should be sent (step E7).

In order to determine PortPub_B, the gateway 106A begins by verifying whether a destination port number DefDestPort_TA (referred to as the initial destination port) is included in the first data packet request.

If so, the gateway 106A replaces the destination port DefDest_PortTA initially included in the data packet with a new destination port PortPub_B. This new destination port corresponds to the public port assigned by the gateway 106B to the application 104B. In the example described herein, the destination port PortPub_B taking the place of the port DefDest_PortTA is calculated as follows:

If $$0 \leq \text{DefDest\_Port}TA < 1024 + EPSUL$$

i.e. if the destination port of the packet sent by the terminal 102A is a well-known port (in EPC_0), or a specific port (in EPSU_0), then:

PortPub_B=DefDest_PortTA+(i_B·N)

In other words, the number of the destination port of the data packet is incremented by (i_B·N) ports so as to be shifted into EPC_i_B or EPSU_i_B, as appropriate.
If 1024+EPSUL≤DefDest_PortTA then the gateway 106A determines whether its NAT table 108A contains an entry associating the port DefDest-Port_TA with a public port number.

In the present example, this is the first packet sent by the application client 104A to the service 104B such that such a NAT entry cannot be present in the NAT table 108A. Consequently, this possibility is not considered at this point.

Furthermore, if the gateway 106A determines that no destination port number DefDest_PortTA is initially included in this first data packet (e.g. an ICMP/ping packet), but that an (AdresPub_B, i_B) entry is indeed present in the RangeAdresTable table 116A, then the gateway 106A proceeds to encapsulate the data packet in a new data packet (typically an IP/UDP packet) having as its destination port a public port PortPub_B such that:

PortPub_B=PS_0+(i_B·N)

In other words, the special port PS_0 used by default for transmitting packets that do not have a destination port is incremented by (i_B·N) ports in order to become the port PS_i_B in the port range i_B.

The above-described processing operations relating to the destination port of the first data packet are performed by the data processor module 222A included in the gateway 106A, with this module making use of the RangeAdresTable table 116A.

Furthermore, the gateway 106A does not modify the destination address of the first data packet, i.e. the address AdresPub_B.

In addition, the gateway 106A replaces the local source address AdresPriv_TA included in the first data packet with the public address AdresPub_A of the gateway 106A.

The gateway 106A also verifies whether a source port Port_TA is included in the first data packet, this port being the local port used by the application client 104A to reach the application 104B.

If so, the gateway 106A replaces the source port Port_TA initially included in the data packet with a new source port PortPub_A. This new source port corresponds to the public port assigned by the gateway 106A to the application 104A. In the example described herein, the destination port PortPub_A replacing the port Port_TA is calculated as follows:
If 0≤Port_TA<1024+EPSUL i.e. if the source port of the packet sent by the terminal 102A is a well-known port (in EPC_0) or a specific port (in EPSU_0), then:

PortPub_A=Port_TA+(i_A·N)

In other words, the port number of the data packet is incremented by (i_A·N) ports so as to be shifted into EPC_i_A or EPSU_i_A, as appropriate.

In addition, the gateway 106A creates an (Adres_TA, Port_TA) entry in its PrivPortAdresTable table 118A (FIG. 2). This table provides information about the link between the local ports situated in the subset EPC_0 or EPSU_0 that are used in the local network LAN_A, and the local IP addresses of the local terminals using these local ports.

In the presently-described example, it should be observed that an (Adres_TA, Port_TA) entry is created in the PrivPortAdresTable table 118A since the application client 104A is declaring for the first time to the gateway 106A that it uses the port Port_TA. In contrast, if an (Adres_TA, Port_TA) entry is already present in the PrivPortAdresTable table 118A, then no additional entry is created.

Furthermore, under such circumstances, the calculation of Port_TA is performed in the same manner as if the terminal 102A was a server (such as the server 102B, for example). This uniform mode of operation is advantageous in that the gateways can process the source port of a data packet in the same manner for a packet sent by a terminal and a packet sent by a server.
If 1024+EPSUL≤Port_TA then the gateway 106A consults its NAT table 108A in such a manner that:
1) if there already exists a conventional NAT entry of the (Adres_TA, Port_TA, AdresPub_A, PortPub_A) type in the NAT table 108A, then the gateway 106A reuses this entry in conventional manner in order to determine AdresPub_A and PortPub_A; else
2) a new conventional NAT entry of the (Adres_TA, Port_TA, AdresPub_A, PortPub_A) type is created in the NAT table 108A of the gateway 106A, the public port PortPub_A being selected from the port range EAP_i_A of the port range i_A (port range allotted to the gateway 106A).

In contrast, if during its verification the gateway 106A determines that no source port Port_TA is included in the first data packet (e.g. as applies to an ICMP/ping packet), then it proceeds to encapsulate the data packet in a new packet (typically an IP/UDP packet). The public source port PortPub_A of the encapsulating packet is typically selected from the subset EAP_i_A. The (Adres_TA, PS_0, AdresPub_A, PortPub_A) entry is then placed in the NAT table 108A, with PS_0 serving in this example merely to indicate the port-free nature of the data packet being sent. As described in greater detail below, if the gateway 106A receives in response a second data packet with, as its destination port, the public source port PortPub_A of the above NAT entry, then the response is transmitted by the gateway 106A to the terminal TA.

In this implementation, the processing of the source port is performed by the data processing module 222A that uses the RangeAdresTable table 116A, the PrivePortAdresTable table 118A, and/or the NAT table 108A, in compliance with the circumstances described above.

The first data packet is then transmitted by the gateway 106A and received by the gateway 106B (step E8).

Once the first packet has been received, the gateway 106B processes the source port PortPub_A included in the packet by consulting its RangeAdresTable table 116B so as to determine whether said table includes an (AdresPub_A, i_A) entry (step E9).

If such an entry is already present in the RangeAdresTable table 116B, that means, for example, that the application 104A has already been the subject of a DNS search by the gateway 106B. This situation is not envisaged in this example since the sender of the first packet is an application client (a web browser) seeking to access a web server hosted on the server 102B.

In contrast, if an (AdresPub_A, i_A) entry is not present in the RangeAdresTable table 116B (as in the present example), then the gateway 106E cannot determine whether the gateway 106A from which the data packet originates is a gateway having a shared IP address in accordance with the invention. Consequently, the gateway 106B does not modify the source port PortPub_A included in the first data packet.

Furthermore, the gateway 106B replaces the public destination address AdresPub_B and the public port PortPub_B with the local address Adres_SB and the local port Port_SB, respectively. The local address Adres_SB and the local port Port_SB are determined as follows:

If $$0 \le PortPub\_B - (i\_B \cdot N) < 1024 + EPSUL$$

i.e. if the port PortPub_B is a port in the subset EPC_i_B or EPSU_i_B in the range i_B, then:

$$Port\_SB = PortPub\_B - (i\_B \cdot N)$$

In other words, the destination port PortPub_B included initially in the first data packet is decremented by (i_B·N) ports so as to be returned to the subset EPC_0 or EPSU_0, as appropriate.

The gateway 106B then consults its PrivPortAdresTable table 118B and recovers the (Adres_SB, Port_SB) entry present in this table. From the port number Port_SB, the gateway determines the corresponding local destination address Adres_SB for reaching the application 104B.

If $$PortPub\_B - (i\_B \cdot N) = PS\_0$$

then the data packet is a packet encapsulating a port-free originating packet (e.g. an ICMP/ping packet). The gateway 106B then decapsulates the packet and proceeds with the processing appropriate for a packet of this type.

If $$PortPub\_B - (i\_B \cdot N) \ge 1024 + EPSUL$$

i.e. if PortPub_B lies in the subset EAP_i_B, then the gateway 106B verifies whether a traditional NAT entry of the (Adres_SB, Port_SB, AdresPub_B, PortPub_B) type exists in the NAT table 108B. If such a NAT entry exists, it is used for determining the local address Adres_SB and the local port Port_SB to which the first data packet should be sent in order to reach the application 104B. In contrast, if no NAT entry of this type exists in the table 108B, then the gateway 106B does not transmit the first data packet to the application 104B, and the data packet is thus rejected.

The above-described operations relating to processing the destination port and the destination address of the first data packet received by the gateway 106B are performed by the data processor module 222B that makes use of the RangeAdresTable table 116B, the PrivPortAdresTable table 118B, and/or the NAT table 108A, as appropriate.

Once the ports and the addresses have been processed, the gateway 106B transmits the first data packet to the port Port_SB of the server 102B (step E10), the local IP address of the server 102B being Adres_SB.

The server thus receives the first data packet which is processed by the application 104B. In response, the application 104B sends a second data packet to the application client 104A (step E11). The second data packet includes:
- a source address Adres_SB specific to the server 102B;
- a source port Port_SB specific to the application 104B;
- a destination address AdresPub_A corresponding to the public IP address of the gateway 106A; and
- a destination port PortPub_A corresponding to the port assigned by the gateway 106A to the application 104A.

Once this second data packet has been received, the gateway 106B processed the destination port PortPub_A by consulting its RangeAdresTable table 116B so as to determine whether there exists an entry of the (AdresPub_A, i_A) type.

If such an entry is not present in the RangeAdresTable table 116B, then the gateway 106E considers that no processing is to be performed on the destination port. Consequently, the gateway 106B does not modify the destination port PortPub_A included in the second data packet, this port corresponding to the public port that the gateway 106A has assigned to the application 104A.

The gateway 106B also does not modify the destination address AdresPub_A corresponding to the public address of the gateway 106A.

The gateway 106B also determines the public source port PortPub_B and the public source address AdresPub_B from which the second data packet is to be sent.

More precisely, the gateway 106B verifies whether a source port Port_SB is initially included in the second data packet. If so, then the gateway 106B replaces the local source address Adres_SB and the local source port Port_SB with the public source address AdresPub_B and the public source port PortPub_B, respectively. The public source port PortPub_B is determined as follows:

If $$0 \le PortPub\_B < 1024 + EPSUL$$

i.e. if the source port Port_SB of the second data packet sent by the server 102B is a well-known port situated in the subset EPC_0 or a specific port situated in the subset EPSU_0, then:

$$PortPub\_B = Port\_SB + (i\_B \cdot N)$$

In other words, the source port Port_SB is incremented by (i_B·N) ports in order to be shifted into the subset EPC_i_B or EPSU_i_B, as appropriate.

In addition, the gateway 106B consults the PrivPortAdresTable table 118B in order to verify that the (Adres_SB, Port_SB) entry exists. In the present example, this entry does exist, so no additional entry is created. In contrast, if the entry is not present in the PrivPortAdresTable table 118B, then it is created by the gateway 106B.

If $$PortPub\_B \ge 1024 + EPSUL$$

then the gateway 106B determines whether a NAT entry of the (Adres_SB, Port_SB, AdresPub_B, PortPub_B) type exists in the NAT table 108B. If so, the gateway uses this entry for determining AdresPub_B and PortPub_B.

In contrast, if no entry of this type exists in the NAT table 108B, then the gateway 106B selects a public port PortPub_B from the port subset EAP_i_B and creates a new NAT entry of the (Adres_SB, Port_SB, AdresPub_B, PortPub_B) type in the NAT table 108B. The public port PortPub_B is then assigned by the gateway 106B to the application 104B.

In this example, the situation

Port_SB≥1024+*EPSUL* cannot occur since the server 102B always sends with a port in the subset EPC_0 or EPSU_0.

In contrast, if the first data packet received was encapsulating a port-free packet, and if after appropriate processing the response for sending was likewise a port-free packet (e.g. an ICMP/ping packet), then the gateway 106B sends the response packet by encapsulating it in a packet having the following characteristics:
- source address=AdresPub_B;
- source port=PS_0+(i_B·N);
- destination address=AdresPub_A; and
- destination port=source port PortPub_A of the encapsulating packet previously received by the gateway 106B.

The above-described operations relating to the processing of ports and addresses for the second data packet are performed by the data processor module 222B that makes use of the RangeAdresTable table 116B, the PrivPortAdresTable table 118B, and/or the NAT table 108B, as appropriate.

The gateway 106B thus transmits the second data packet to the public destination address AdresPub_A at the destination port PortPub_A (step E13).

Once the second data packet has been received, the gateway 106A processes the source port PortPub_B included in that packet (step E14). To do this, the gateway 106A consults its RangeAdresTable table 116A in order to recover the entry (AdresPub_B, i_B).

If no entry of this type exists in the RangeAdresTable table 116A, then the gateway 106A cannot determine whether the gateway 106B is operating with a shared public address in accordance with the invention. Under such circumstances, the gateway 106A does not modify the source port PortPub_B included in the second data packet.

In contrast, if an (AdresPub_B, i_B) entry exists in the RangeAdresTable table 116A, then the gateway 106A replaces the source port PortPub_B included in the second data packet with the source port ChangedSourcePort_B, which is determined as follows:
If 0≤PortPub_*B*−(*i_B*·*N*)<1024+*EPSUL* i.e. if the source port PortPub_B lies in the subset EPC_i_B or EPSU_i_B, then:

ChangedSourcePort_*B*=PortPub_*B*−(*i_B*·*N*)

In other words, the source port number included in the second data packet is decremented by (i_B·N) ports in order to be returned to the appropriate subset EPC_0 or EPSU_0.
If PortPub_*B*−(*i_B*·*N*)≥1024+*EPSUL* i.e. if the source port PortPub_B lies in the subset EAP_i_B, then the gateway 106A does not modify the source port PortPub_B. Under such circumstances, ChangedSourcePort_*B*=PortPub_*B*

It should be observed that this cannot arise in the example described here since the second data packet is sent by a server so that the source port used is necessarily in one of the port subsets EPC_0 or EPSU_0.

In contrast, if:

PortPub_*B*−(*i_B*·*N*)=PS_0 then this is an IP/UDP packet encapsulating a port-free internal data packet (e.g. an ICMP/ping packet). The processing of such a packet is described in greater detail below when examining the destination port.

The above-described operations relating to the processing of the source port of the second data packet are performed by the data processor module 222A which makes use of the RangeAdresTable table 116A.

Furthermore, the gateway 106A does not modify the source address AdresPub_B included in the second data packet.

In addition, the gateway 106A determines the local destination address Adres_TA and the local destination port Port_TA corresponding to the application client 104A to which the second data packet is to be transmitted. To do this, the gateway 106A verifies the local destination port Port_TA included in the second data packet.

The gateway then replaces the public destination address AdresPub_A and the public destination port PortPub_A with the local address Adres_TA and the local port Port_TA, respectively, where these are determined as follows:
If 0≤PortPub_*A*−(*i_B*·*N*)<1024+*EPSUL* i.e. if the public destination port PortPub_A lies in the subset EPC_i_a or EPSU_i_A, then:

Port_*TA*=PortPub_*A*−(*i_A*·*N*)

In other words, the destination port number PortPub_A initially included in the second data packet is decremented by (i_A·N) so as to become the source port Port_TA used by the application 104A.

The gateway 106A also consults its PrivPortAdresTable table 118A in order to recover the previously recorded (Adres_TA, Port_TA) entry. Using the value for Port_TA, the gateway 106A determines the local IP address Adres_TA of the terminal 102A hosting the application 104A.
If PortPub_*A*−(*i_A*·*N*)≥1024+*EPSUL* i.e. if the destination public port PortPub_A lies in the subset EAP_i_A, then that means that a conventional NAT entry of the (Adres_TA, Port_TA, AdresPub_A, PortPub_A) type already exists in the NAT table 108A. The gateway then uses this entry to determine Adres_TA and Port_TA.

In particular, if the value of Port_TA in the NAT entry (Adres_TA, Port_TA, AdresPub_A, PortPub_A) is equal to PS_0, that means the second received packet was a packet encapsulating a packet-free port. Under such circumstances, the gateway 106A encapsulates the packet-free port and sends it to the terminal 102A (Adres_TA).

In contrast, if no entry exists in the NAT table 108A associating AdresPub_A and PortPub_A, then the gateway 106A rejects the second data packet.

The above-described operations relating to processing addresses and ports are performed by the data processor module 222A, this module making use of the RangeAdresTable table 116A, the PrivPortAdresTable table 118A, and/or the NAT table 108A, as appropriate.

The gateway 106A thus transmits the second data packet to the terminal 102A (step E15). When the second data packet includes a destination port, it is transmitted to the local destination port Port_TA corresponding to the application 104A.

To sum up, the use of port range identifiers in accordance with the invention makes it possible to eliminate the limitations and drawbacks that are inherent to the conventional port range technique.

The invention makes it possible in particular to mask the real ports (i.e. the public ports) that are used by the intermediate gateways from the application servers and from the application clients.

For example, the invention is advantageous in that the manager of a server (such as the server 102B) does not need to know the port range allotted to its gateway in order to implement an application service.

For example, when a server manager installs a web server in a local network LAN that is accessible via a gateway, the manager needs only to declare the local address of the web server (private address) together with the port associated with the web server in question to the gateway. This declaration may be performed manually by the server manager, e.g. using a specific web page hosted by the gateway. This declaration may also be performed automatically by means of a universal plug and play (UPnP) client (Internet gateway device (IGD) profile) that is capable of interacting with UPnP software situated in the gateway in order to request a static configuration linking its port and its local address. Clients of the UPnP IGD type are in very widespread use in present terminals and computers for declaring an application to a gateway.

The invention is thus advantageous in that it enables shared public IP addresses to be used without modifying the operation of conventional terminals and servers. The invention does not require any modification to the operation of a client of the UPnP type. A server implementing a web server, for example, can use its port as defined by default (i.e. the port 80) without needing to take account of the port range that has been allotted to its gateway. Similarly, a server implementing a specific application (e.g. in the context of professional or business services) can use its port as defined by default without taking account of the port range allotted to the gateway.

Furthermore, a terminal implementing a client application has no need to be capable of using the SRV function in order to reach an application located behind a gateway that has a shared IP address. A client application implemented on a terminal has no need to know the public port that is to be used for reaching a service available on a remote server. The terminal in question also has no need to take account of the port range allotted to its gateway. The terminal hosting the client application need only use the port defined by default in order to reach the service in question.

It is possible to mask the public ports that are used by the gateways from client applications and service because of the use of tables of the RangeAdresTable table type that contain at least one link between a shared IP address and a port range identifier. The identifier may correspond to the port range allotted to the gateway containing the RangeAdresTable table in question or it may correspond to a port range allotted to another gateway that is accessible via a communications network (e.g. such as the Internet).

It should be observed that a port range identifier may be a range number, for example. Nevertheless, other types of identifier can be envisaged.

The invention also advantageously makes it possible to transport data packets that do not have a destination port (packets of the ICMP type) to a gateway that has a shared IP address. This applies in particular when sending packets of the ping type.

Furthermore, when a port range is allotted to a gateway, the invention advantageously makes it possible to use a portion of that range (the subset EPA_i in the above description) in conventional manner by means of a NAT table, and to use the remainder of that range in accordance with the invention (shifting ports as a function of the port range identifiers associated with the gateways involved).

Furthermore, a gateway implementing a transmission method of the invention is capable of exchanging data with a gateway that does not share a public IP address.

The present invention may be applied in a wide variety of contexts. For example, the invention may be applied to residential access to the Internet. Thus, clients having a gateway in accordance with the invention can have easier access to a service that is accessible via a remote gateway whose IP address is a shared address. The client has no need to use the SRV function or to access an intermediate web page in order to reach the looked-for service. The invention also applies to servers implemented in home networks. Such servers are being used to an ever-greater extent in home environments. For example, it is becoming more and more frequent to install multimedia or home-automation servers in home networks, these servers being remotely accessible by the user.

The invention may also be applied to professional services, which services may make use of specific ports in local networks.

Particular applications of the invention are also to be found in the context of business services having a local network in which servers make use of shared IP addresses (as is typical for small professional sites).

The invention claimed is:

1. A method of managing a DNS request carried out by a DNS server, said method comprising:
   receiving a DNS request from a first gateway in order to access a remote application accessible via a second gateway, the first gateway and the second gateway each being allocated a shared IP address which is shared with at least one client device to which the shared IP address is allocated and a range of a plurality of ports for the shared IP address;
   sending to the first gateway a DNS response including the shared IP address of said second gateway;
   a verification step for determining whether a port range identifier, identifying the range of the plurality of ports allocated to said second gateway, is stored in said DNS server in association with the shared IP address of said second gateway; and
   inserting said identifier in the DNS response before sending said DNS response to the first gateway if the port range identifier, identifying the range of the plurality of ports allocated to said second gateway, is stored in said DNS server in association with the shared IP address of said second gateway.

2. A computer program stored in a computer memory and including instructions for executing steps of the method of managing a DNS request according to claim 1 when said program is executed by a computer.

3. A non-transitory computer-readable recording medium having recorded thereon a computer program including instructions for executing steps of the method of managing a DNS request according to claim 1.

4. A method of transmitting data in a first gateway to a second gateway, said method comprising:
   sending a DNS request to a DNS server from the first gateway to access a remote application accessible via the second gateway, the first gateway and the second gateway each being allocated a shared IP address which is shared with at least one client device to which the shared IP address is allocated and a range of a plurality of ports for the shared IP address;

receiving from the DNS server a DNS response including the shared IP address of the second gateway and a port range identifier identifying the range of the plurality of ports allocated to the second gateway;

storing in the first gateway the port range identifier and the shared IP address associated with the second gateway to which said data is to be transmitted, said port range identifier being obtained from the DNS server in response to the DNS request;

determining, using said port range identifier, a destination port number of the second gateway to which the data is to be transmitted; and sending said data to said destination port number of the second gateway.

5. The method according to claim 4, wherein the determination step further comprises:

when a destination port number is initially included in said data, acting during the determining step to determine the destination port number of the second gateway to which the data is to be transmitted from the port range identifier and from the initial destination port number, and replacing the initial destination port number with said destination port number determined during the determining step; or when no destination port number is initially included in said data, encapsulating said data in a data packet including the destination port as determined during said determining step.

6. The method according to claim 4, said method further including transmitting together with said data a source port number determined from a port range identifier associated with the first gateway, said port range identifier being stored in said first gateway.

7. A computer program stored in a computer memory and including instructions for executing steps of the data transmission method according to claim 4 when said program is stored in a computer memory and executed by a computer.

8. A non-transitory computer-readable recording medium having recorded thereon a computer program including instructions for executing steps of the data transmission method according to claim 4.

9. A method of transmitting a first data packet from a second gateway to a server of a local network accessible via said second gateway, said method comprising:

sending a DNS request to a DNS server from a first gateway to access a remote application accessible via the second gateway, the first gateway and the second gateway each being allocated a shared IP address which is shared with at least one client device to which the shared IP address is allocated and a range of a plurality of ports for the shared IP address;

receiving from the DNS server a DNS response including the shared IP address of the second gateway and a port range identifier identifying the range of the plurality of ports allocated to the second gateway;

storing in the first gateway the port range identifier and the shared IP address associated with the second gateway to which the first data packet is to be transmitted, said port range identifier being obtained from the DNS server in response to the DNS request;

determining, using said port range identifier, a destination port number of the second gateway to which the first data packet is to be transmitted;

sending said first data packet to said destination port number of the second gateway;

storing the port range identifier of a port range associated with said second gateway;

determining, using said port range identifier and a destination port number initially included in the first data packet, the destination port number of the server to which said first data packet is to be transmitted; and sending said first data packet to said destination port number of the server.

10. The method according to claim 9, said method further comprising:

said second gateway receiving a second data packet sent by the server in response to said first data packet;

determining, using said port range identifier, a source port number for transmitting with said second data packet; and sending the second data packet from said source port number.

11. A computer program stored in a computer memory and including instructions for executing steps of the data transmission method according to claim 9 when said program is executed by a computer.

12. A non-transitory computer-readable recording medium having recorded thereon a computer program including instructions for executing steps of the data transmission method according to claim 9.

13. A DNS server, comprising a processor and memory, configured to process a DNS request, said processor and memory being configured to execute code to perform the following steps:

receiving a DNS request to access a remote application accessible via a gateway having a shared IP address which is shared with at least one client device to which the shared IP address is allocated and an allocated range of a plurality of ports for the shared IP address;

sending a DNS response including the shared IP address of said gateway;

determining whether a port range identifier, identifying the range of the plurality of ports allocated to said gateway, is stored in said DNS server in association with the shared IP address of said gateway; and inserting said port range identifier into the DNS response before sending said DNS response when the result of said determination is positive.

14. A gateway, comprising:

a processor; and memory;

wherein said gateway is configured to transmit data to a second gateway via a data transmission method comprising:

sending a DNS request to a DNS server from the gateway to access a remote application accessible via the second gateway, the gateway and the second gateway each being allocated a shared IP address which is shared with at least one client device to which the shared IP address is allocated and a range of a plurality of ports for the shared IP address;

receiving from the DNS server a DNS response including the shared IP address of the second gateway and a port range identifier identifying the range of the plurality of ports allocated to the second gateway;

storing in the gateway the port range identifier and the shared IP address associated with the second gateway to which said data is to be transmitted, said port range identifier being obtained from the DNS server in response to the DNS request;

determining, using said port range identifier, a destination port number of the second gateway to which the data is to be transmitted; and sending said data to said destination port number of the second gateway;

wherein said processor and memory are configured to execute code to perform the following steps:

using a port range identifier associated with the shared IP address of the second gateway to determine a destination port number to which the data is to be transmitted; and sending said data to said destination port number.

15. A gateway, comprising:

a processor; and memory;

wherein the gateway is configured to transmit data to a server of a local network accessible via said gateway via a data transmission method comprising:

sending a DNS request to a DNS server from the gateway to access a remote application accessible via a second gateway, the gateway and the second gateway each being allocated a shared IP address which is shared with at least one client device to which the shared IP address is allocated and a range of a plurality of ports for the shared IP address;

receiving from the DNS server a DNS response including the shared IP address of the second gateway and a port range identifier identifying the range of the plurality of ports allocated to the second gateway;

storing in the gateway the port range identifier and the shared IP address associated with the second gateway to which the data is to be transmitted, said port range identifier being obtained from the DNS server in response to the DNS request;

determining, using said port range identifier, a destination port number of the second gateway to which the data is to be transmitted;

sending said data to said destination port number of the second gateway;

storing the port range identifier of a port range associated with said second gateway;

determining, using said port range identifier and a destination port number initially included in the data, the destination port number of the server to which said data is to be transmitted; and sending said data to said destination port number of the server;

wherein said processor and memory are configured to execute code to perform the following steps:

storing a port range identifier associated with said gateway;

using said identifier to determine the destination port number of the server to which the data is to be transmitted; and sending said data to said destination port number.

\* \* \* \* \*